US008485156B2

(12) United States Patent
Kathan

(10) Patent No.: US 8,485,156 B2
(45) Date of Patent: Jul. 16, 2013

(54) ROTARY INTERNAL COMBUSTION ENGINE

(76) Inventor: Larry Kathan, Edmonton (CA)

( * ) Notice: Subject to any disclaimer, the term of this patent is extended or adjusted under 35 U.S.C. 154(b) by 738 days.

(21) Appl. No.: 12/442,903

(22) PCT Filed: Sep. 26, 2007

(86) PCT No.: PCT/CA2007/001720
§ 371 (c)(1),
(2), (4) Date: Mar. 25, 2009

(87) PCT Pub. No.: WO2008/037075
PCT Pub. Date: Apr. 3, 2008

(65) Prior Publication Data
US 2010/0083932 A1  Apr. 8, 2010

Related U.S. Application Data

(60) Provisional application No. 60/847,210, filed on Sep. 26, 2006.

(51) Int. Cl.
*F02B 53/00* (2006.01)
*F02B 57/08* (2006.01)
*F01B 13/04* (2006.01)
*F01B 3/00* (2006.01)

(52) U.S. Cl.
USPC ...... 123/244; 123/43 R; 123/44 E; 123/44 D; 123/45 R

(58) Field of Classification Search
USPC ............ 123/200, 243, 244, 43 R, 44 D, 44 E, 123/45 R, 45 A
See application file for complete search history.

(56) References Cited

U.S. PATENT DOCUMENTS

| 836,945 | A | 11/1906 | Pool |
| 836,950 | A | 11/1906 | Poole |
| 1,243,691 | A | 10/1917 | Biayney |
| 2,040,401 | A | 5/1936 | Persons |

(Continued)

FOREIGN PATENT DOCUMENTS

| BE | 862 897 | 5/1978 |
| DE | 115 182 | 9/1975 |

(Continued)

OTHER PUBLICATIONS

Notification of Reason(s) of Rejection. Japanese Patent Application No. 2009-529478. Mailed Nov. 8, 2011. 5 pages. English Translation 11 pages.

(Continued)

*Primary Examiner* — Thai Ba Trieu
*Assistant Examiner* — Deming Wan
(74) *Attorney, Agent, or Firm* — Davis & Bujold, PLLC

(57) ABSTRACT

A rotary internal combustion engine, includes a housing, a rotating plate assembly and a stationary plate assembly. The rotating plate assembly has a plurality of vanes disposed between an inflow passage and an outflow passage. The stationary plate assembly defines a piston chamber in which is disposed a reciprocating piston. Rotation of a crank shaft rotates the rotating plate assembly and rotation of the rotating plate assembly rotates the crank shaft. Valves are coupled to the crank shaft, such that rotation of the crank shaft opens and closes the valves during the combustion cycle. Each piston is coupled to the crank shaft such that rotation of the crank shaft results in reciprocal movement of the pistons in the piston chambers.

35 Claims, 11 Drawing Sheets

U.S. PATENT DOCUMENTS

| | | | |
|---|---|---|---|
| 2,234,074 A | | 3/1941 | Carlson |
| 3,572,030 A * | | 3/1971 | Cuff .................. 123/231 |
| 3,599,612 A * | | 8/1971 | Villella .................. 123/44 D |
| 3,688,751 A * | | 9/1972 | Sahagian .................. 123/44 B |
| 3,702,602 A * | | 11/1972 | Lotesto .................. 123/45 R |
| 3,731,661 A | | 5/1973 | Hatfield et al. |
| 3,739,756 A * | | 6/1973 | Villella .................. 123/44 C |
| 3,757,515 A | | 9/1973 | Pais |
| 3,872,852 A * | | 3/1975 | Gilbert .................. 123/193.1 |
| 4,008,694 A * | | 2/1977 | Monn .................. 123/41.4 |
| 4,077,365 A * | | 3/1978 | Schlueter .................. 123/43 R |
| 4,239,027 A * | | 12/1980 | Lay .................. 123/203 |
| 4,288,981 A | | 9/1981 | Wright |
| 4,344,288 A | | 8/1982 | Heaton |
| 5,000,136 A * | | 3/1991 | Hansen et al. .................. 123/80 BB |
| 5,070,825 A * | | 12/1991 | Morgan .................. 123/43 A |
| 5,081,966 A * | | 1/1992 | Hansen et al. .................. 123/190.4 |
| 5,123,394 A * | | 6/1992 | Ogren .................. 123/44 D |
| 5,181,490 A * | | 1/1993 | Ruzic .................. 123/243 |
| 5,279,110 A | | 1/1994 | Lin |
| 5,404,850 A * | | 4/1995 | La Bell, Jr. .................. 123/263 |
| 5,415,135 A * | | 5/1995 | Dale .................. 123/44 B |
| 6,167,850 B1 * | | 1/2001 | Blount .................. 123/44 D |
| 6,615,586 B1 | | 9/2003 | Boric |
| 7,025,036 B2 * | | 4/2006 | Lampard .................. 123/261 |
| 7,143,737 B2 | | 12/2006 | Kim |
| 7,353,784 B2 * | | 4/2008 | Nicholson, IV .................. 123/43 R |
| 2005/0263128 A1 | | 12/2005 | Yadegar |
| 2007/0095307 A1 * | | 5/2007 | Sabin .................. 123/43 R |
| 2007/0107678 A1 * | | 5/2007 | Atkins, Sr. .................. 123/45 R |

FOREIGN PATENT DOCUMENTS

| | | |
|---|---|---|
| DE | 28 31 254 | 1/1980 |
| DE | 29 00 317 | 7/1980 |
| DE | 32 35 888 | 2/1984 |
| DE | 39 09 299 | 9/1990 |
| DE | 195 27 277 | 8/1996 |
| EP | 1753946 | 2/2007 |
| FR | 2702007 A1 | 2/1994 |
| GB | 423657 | 1/1935 |
| GB | 511331 | 8/1939 |
| GB | 511331 | 9/1939 |
| GB | 1465413 | 2/1977 |
| GB | 2 104 154 | 3/1983 |
| JP | H08-504496 A | 5/1996 |
| JP | 2006-200375 A | 8/2006 |
| RU | 2 021 909 | 10/1994 |
| RU | 2 021 909 C1 | 10/1994 |
| WO | WO 94/09261 | 4/1994 |
| WO | WO 00/70188 | 11/2000 |
| WO | 2005106203 A1 | 11/2005 |
| WO | WO 2006/007259 | 1/2006 |

OTHER PUBLICATIONS

Japanese Official Action dated Apr. 17, 2012 with English translation.

* cited by examiner ly within the housing. Use of vane rings provides a lighter weight engine and reduces the amount of material that will contact or rub against other components inside engine 10.

ROTARY INTERNAL COMBUSTION ENGINE

FIELD

The present invention relates to a rotary internal combustion engine

BACKGROUND

There are a variety of rotary engines known in the prior art. U.S. Pat. No. 7,143,737 is just one example.

SUMMARY

There is provided a rotary internal combustion engine, which includes a housing, a rotating plate assembly and at least one stationary plate assembly. The rotating plate assembly is mounted for rotation within the housing and has at least one inflow passage for receiving combustion gases, at least one outflow passage for venting combustion gases, and a plurality of vanes disposed between the at least one inflow passage and the at least one outflow passage. Combustion gases encounter the vanes and impart a rotational force to the rotating plate assembly as the combustion gases pass from the at least one inflow passage to the at least one outflow passage. The stationary plate assembly is fixed within the housing immediately adjacent to the rotating plate assembly and defines at least one piston chamber in which is disposed a reciprocating piston. Each piston chamber has at least one inflow port for combustible fuel and air mixture, at least one igniter for igniting the combustible gases, at least one outflow port, and valves for selectively opening and closing of the inflow port and the outflow port to facilitate a fuel and air injection, compression, ignition and exhaust combustion cycle. Each outflow port is in fluid communication with the at least one inflow passage of the rotating plate assembly, such that combustion gases exiting each outflow port flow into the rotating plate assembly. A crank shaft is mounted for rotation in the housing and is coupled for rotation with the rotating plate assembly. Rotation of the crank shaft rotates the rotating plate assembly and rotation of the rotating plate assembly rotates the crank shaft. Valves are coupled to the crank shaft, such that rotation of the crank shaft opens and closes the valves during the combustion cycle. Each piston is coupled to the crank shaft such that rotation of the crank shaft results in reciprocal movement of the pistons in the piston chambers.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
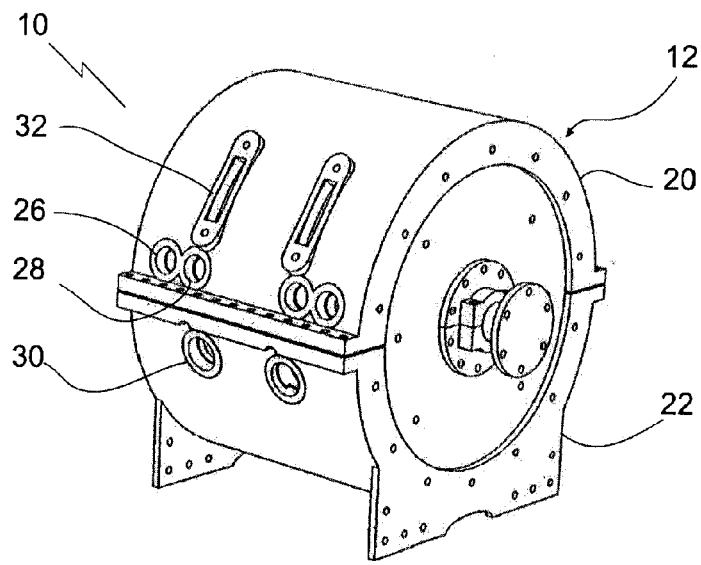
FIG. 1 is a perspective view of a rotary internal combustion engine.

A rotary internal combustion engine generally identified by reference numeral 10, will now be described with reference to FIG. 1 through 18. Referring to FIGS. 4, 5, 10, 11, and 14A-14D, directional arrows 164 refer to the relative velocity of piston 96.

Figure 3:
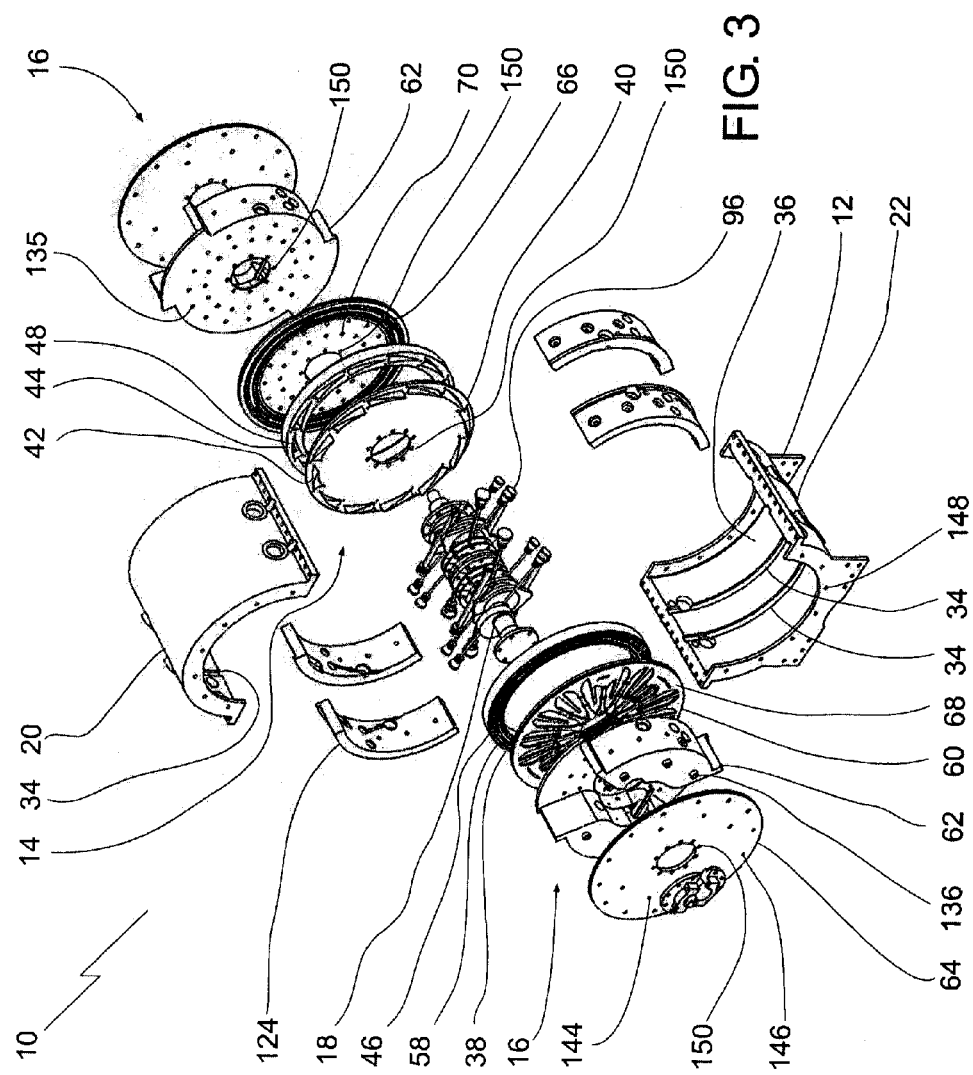
FIG. 3 is an exploded perspective view of the engine from FIG. 1.

Structure and Relationship of Parts:

Referring to FIG. 1, a rotary internal combustion engine 10 is illustrated. Referring to FIG. 3, engine 10 consists of a housing 12, a rotating plate assembly 14, two stationary plate assemblies 16, and a crank shaft 18. Referring to FIG. 1, housing 12 consists of an upper casing 20, and a lower casing 22. Both of casings 20 and 22 have two each of air intake tubes 26, isolation valve tubes 28, gas release tubes 30, and exhaust tubes 32. Air intake tubes 26 supply engine 10 with air, and may be connected through conduits (not shown) to a filter assembly (not shown). Isolation valve tubes 28 and gas release tubes 30 afford access to the appropriate valves located inside engine 10, and are commonly sealed by threaded caps (not shown) that may extend into the other components contained within housing 12. Exhaust tubes 32 are provided for removing exhaust gases from engine 10. Exhaust tubes 32 may be connected to conduits (not shown) that facilitate the removal of exhaust gases. Referring to FIG. 3, both of upper and lower casings 20 and 22, respectively, have circumferential interior grooves 34. Grooves 34 are depressed into an interior surface 36 of housing 12, and facilitate the alignment of the interior components of engine 10. Grooves 34 provide anchor points upon which stationary plate assemblies 16 can be stably positioned to withstand the high air pressures created by the compressed combusted gases contained within rotating plate assembly 14. Grooves 34 also ensure that there are effective seals between stationary plate assemblies 16 and rotating plate assembly 14, by restricting the movement of stationary plate assemblies 16.

Figure 8:
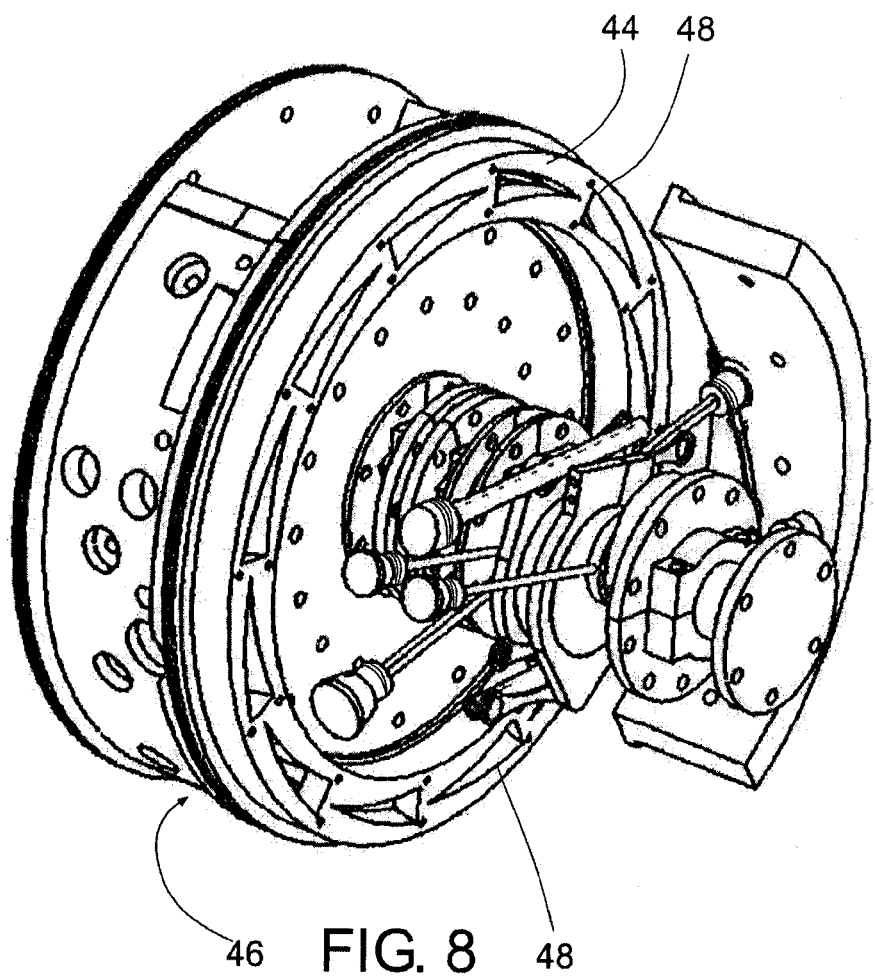
FIG. 8 is a cut-away perspective view illustrating a vane ring from the engine of FIG. 1.
Figure 9:
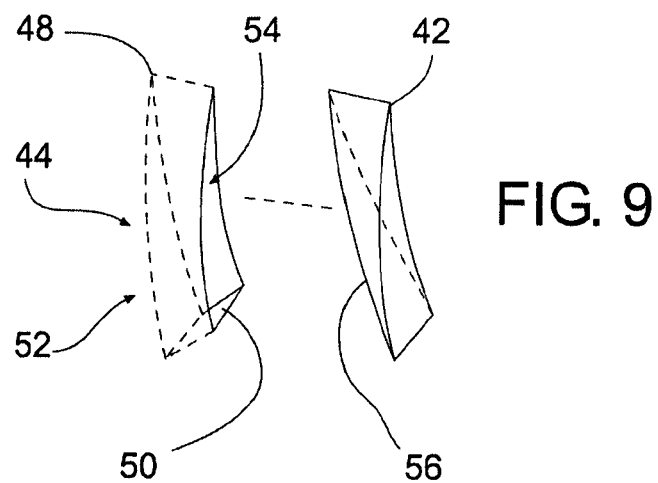
FIG. 9 is perspective view, partially in section, of an air vane with a vane fill from the engine of FIG. 1.
Figure 16:
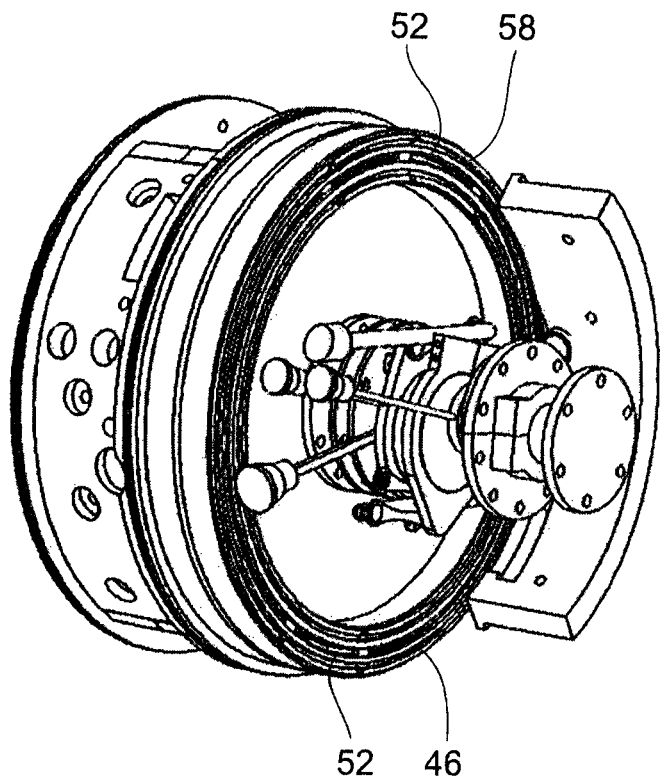
FIG. 16 is a cut-away perspective view illustrating a vane ring from the engine of FIG. 1.

Referring to FIG. 3, rotating plate assembly 14 consists of vane rings 38, and a vane fill disc 40. Alternatively, vane rings 38 may be provided as circular disks mounted for rotation within housing 12. Additionally, vane rings 38 and vane fill disc 40 may be provided as a single disc. Each side of vane fill disc 40 is covered by one vane ring 38. Vane fill disc 40 has, on both sides, vane fills 42 staggered along an outer axial circumference. Vane ring 38 has a first surface 44 and a second surface 46. First surface 44 faces and engages vane fill disc 40. Referring to FIG. 8, a plurality of vanes 48 are staggered circumferentially between first and second surfaces 44 and 46, respectively. Referring to FIG. 9, vanes 48 consist of a propulsion surface 50, a gas inflow slot 52, and a vane fill entry slot 54. Vanes 48 are provided as triangular shaped holes. Vane fill entry slots 54 are positioned on first surface 44. Vane fills 42 line up and engage vanes 48, such that one vane fill 42 is positioned through vane fill entry slot 54 and engages one vane 48 as shown. During operation, combusted gases flow into vanes 48 from gas inflow slot 52 and strike propulsion surface 50, exerting a rotational force upon rotating plate assembly 14. Vane fills 42 have a curved fill surface area 56 defining a wedge-like shape. Curved fill surface area 56 and the triangular shape of vane 48 allow vanes 48 to be positioned closer together without compromising the structural integrity of vane rings 38. By positioning vanes 48 closer together, gas inflow slot 52 from at least one vane 48 will have compressed combusted gases being delivered to it at almost all times during rotation. This arrangement allows a more continuous exertion of rotational force upon rotating plate assembly 14. Vane fills 42 reduce the volume of vanes 48 that compressed gas has to fill before imparting a rotational force upon a surface area of vane 48 as vane 48 rotates. This decreased volume allows the gases to expand and apply pressure against the surface areas of vanes 48 over a greater rotational distance. This arrangement makes the most efficient use of the propulsion available from compressed gases, as the pressure of the compressed gases decreases as vanes 48 rotates. Referring to FIG. 16, gas inflow slots 52 are positioned on second surface 46. Gas inflow slots 52 also function as outflow slots for venting combustion gases. Referring to FIG. 3, vanes 48 are provided of the same size and shape. Alternatively, vanes 48 may be provided in different sizes and shapes relative to one another. Different sizes and shapes may allow the pressure of combusted compressed gases passing into vanes 48 to be more fully transferred into rotational force. Positioned on second surface 46 are multi-row concentric circular labyrinth seals 58. Referring to FIG. 3, rotating plate assembly 14 is positioned within housing 12 in between circumferential interior grooves 34.

Figure 12:
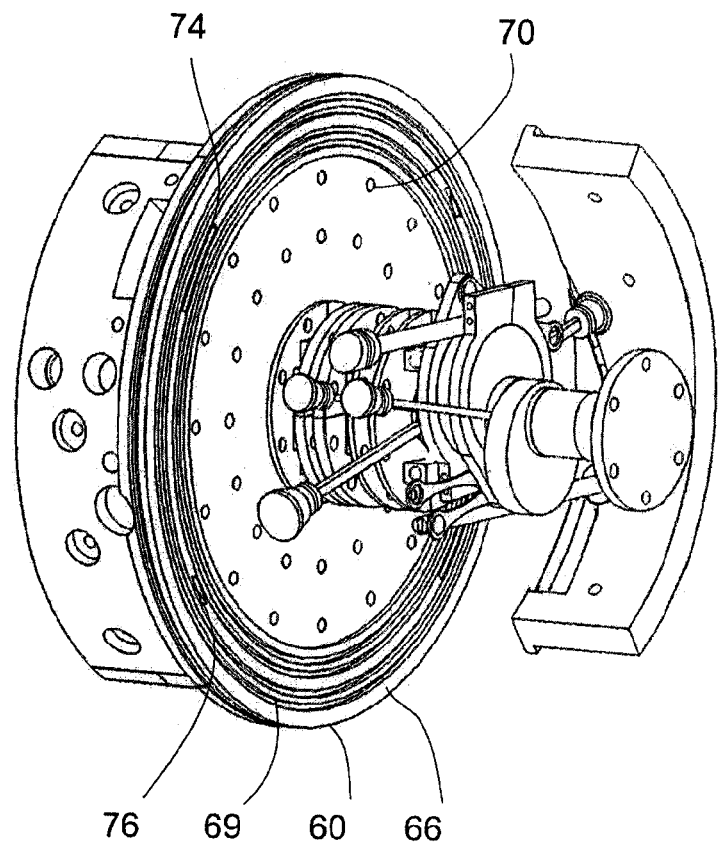
FIG. 12 is cut-away perspective view illustrating the inside face of a pressure containment plate from the engine of FIG. 1.
Figure 13:
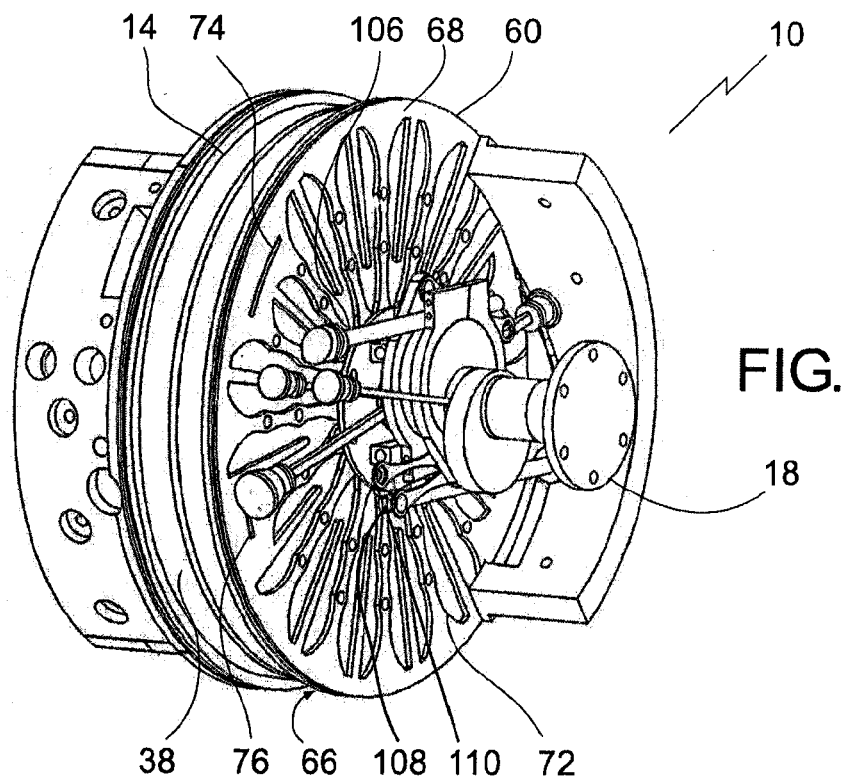
FIG. 13 is a cut-away perspective view illustrating the outside face of the pressure containment plate from FIG. 12.

Referring to FIG. 3, each of stationary plate assemblies 16 consist of a pressure containment plate 60, a valve body 62, and an end plate 64. Each of plates 60, 62 and 64 of plate assembly 16 is provided as circular discs. Stationary plate assemblies 16 are fixably positioned within housing 12 on either side of and immediately adjacent to rotating plate assembly 14. Containment plate 60 has a first surface 66 and a second surface 68. First surface 66 of plate 60 faces second surface 46 of vane ring 38. Referring to FIG. 12, first surface 66 has multi-row concentric circular labyrinth seals 69, and bolt holes 70. Referring to FIG. 3, concentric circular labyrinth seals 69 are ring-like seals that are positioned along an outer axial circumferential area of first surface area 66. Concentric circular labyrinth seals 69 of containment plate 60 engage concentric circular labyrinth seals 58 of vane ring 38, without coming into contact with one another. Both plate assemblies 14 and 16 are mounted on cam shaft 18, with rotating plate assembly 14 rotating relative to stationary plate assembly 16, and thus careful machining is necessary to ensure that seals 58 and 69 do not touch one another. Seals 58 and 69 are designed as a solution to the problem of not being able to rotatably seal vane ring 38 to containment plate 60. Because vanes 48 are in fluid communication with containment plate 60, it is impossible to lubricate in between the two, as any lubrication supplied will enter vanes 48 and be expelled via exhaust gases, and so because no lubrication can be applied, any sealing would result in high friction and engine temperatures. Additionally, it is important to prevent compressed gas from easily escaping from vanes 48, as it is the pressure of the compressed gases that enter vanes 48 that are used to provide rotational energy. Therefore, referring to FIG. 6, seals 58 and 69 were designed to create a complex and difficult path of escape for compressed gases that effectively seals vanes 48 for the period between the time that compressed gas enters vanes 48 to the time that it is expelled as exhaust gas. Referring to FIG. 13, second surface 68 consists of coolant tubing profile 72. Referring to FIGS. 12 and 13, gas outflow passages 74, and gas inflow passages 76 are positioned on both of surfaces 66 and 68. Referring to FIG. 13, coolant tubing profile 72 hooks up with a coolant system 162 (shown in FIG. 18) that runs through crank shaft 18, coolant system 162 supplying oil coolant to all the parts of engine 10 that require cooling. Coolant tubing profile 72 is provided as indents that maximize heat transfer from rotating plate assembly 14 to the coolant. Gas outflow and inflow passages 74 and 76, respectively, are aligned to fluidly communicate with vanes 48 (shown in FIG. 8) of vane ring 38. Vanes 48 are disposed between the inflow and outflow passages 76 and 74, respectively. On each containment plate 60, there are provided at least one each of passages 74 and 76, but preferably two. Gas outflow passage 74 is an exhaust conduit that connects the adjacent vane 48 (shown in FIG. 2) that rotates past en route to gas inflow passage 76. Compressed and combusted gases are provided through gas inflow passage 76 to vane 48 adjacent inflow passage 76. The combusted gases are then contained with the respective vane 48, until vane 48 rotates into fluid communication with gas outflow passage 74. Referring to FIG. 3, containment plates 60 are constructed with a slightly wider outer diameter in order to snugly fit into circumferential interior grooves 34 of housing 12. Because seals 58 and 69 must carefully fit together without touching, the proper machining of grooves 34 is critical in ensuring that containment plates 60 are perfectly aligned within housing 12 in the proper orientation. Grooves 34 effectively anchor containment plates 60 in place, allowing plates 60 to withstand the high pressures created by the compressed combusted gases contained within rotating plate assembly 14, effectively forming air seals with vane rings 38 that contain the pressure. The air pressure created by these gases aids in preventing seals 58 and 69 from coming into contact with one another by forming an air cushion. This air cushion allows rotating plate assembly 14 to rotate without rubbing or grinding against containment plate 60.

Figure 4:
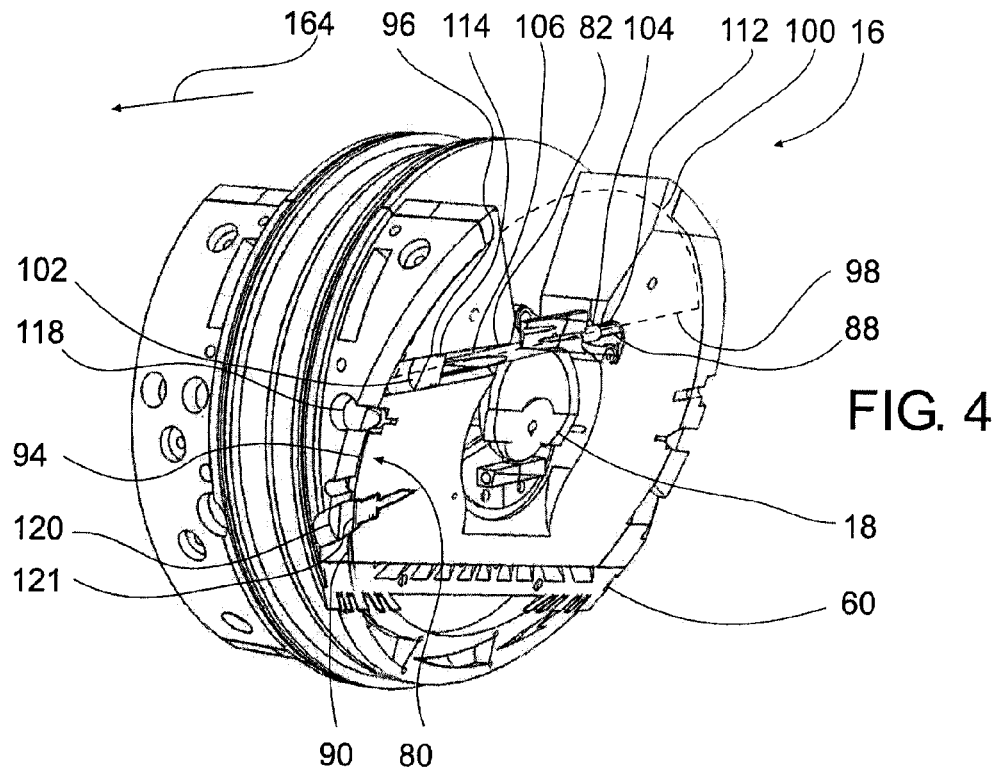
FIG. 4 is a cut-away perspective view illustrating the engine from FIG. 2 with the piston in the compression stage.
Figure 6:
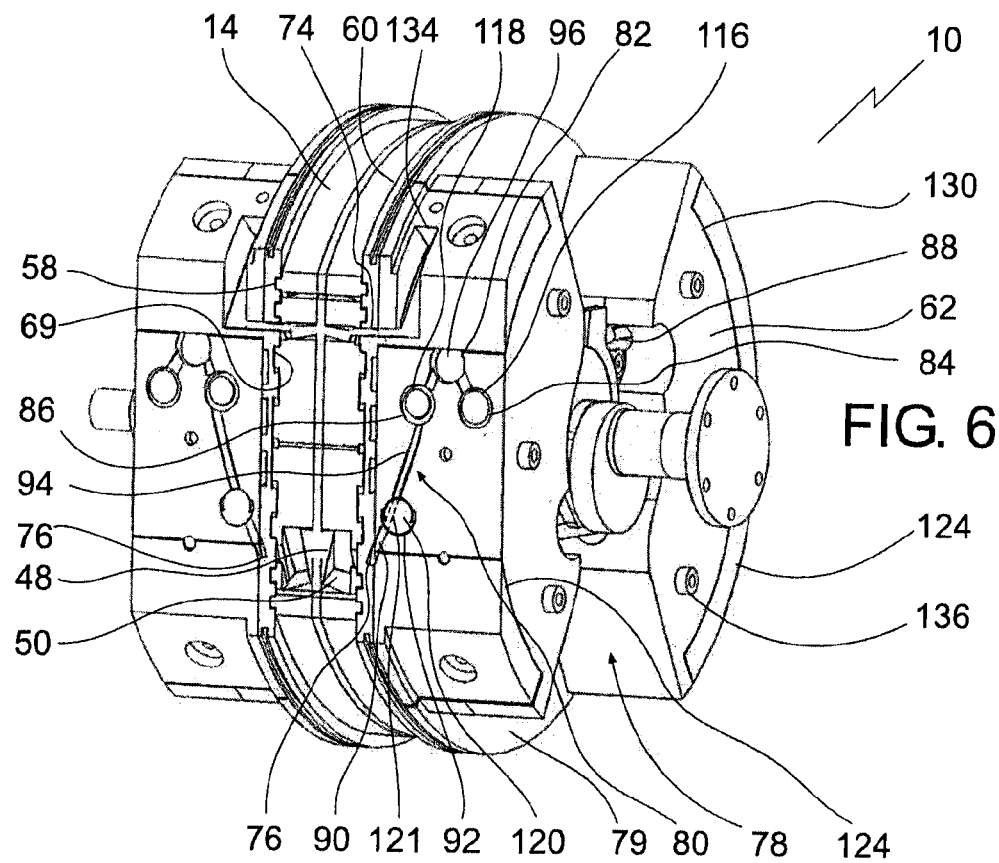
FIG. 6 is a cut-away perspective view illustrating an ignition tube from the engine from FIG. 1.
Figure 14A:
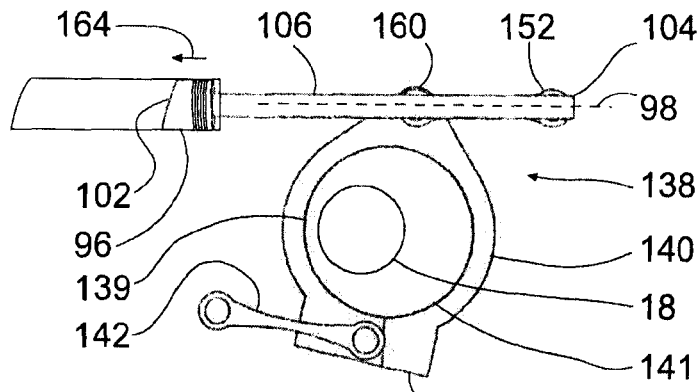
FIG. 14A-D are side elevation views illustrating the piston cam clamp and piston at various stages of compression/inflow.
Figure 14B:
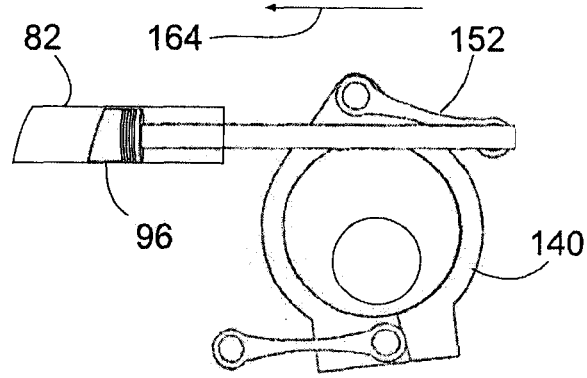

Referring to FIG. 6, valve body 62 is illustrated consisting of cut-out portions 78, and piston chambers 80. Cut-out portions 78 are included to reduce the overall weight of engine 10. Cut-out portions 78 define a mounting surface area 79 upon which containment plate 60 can be bolted to. At least one piston chamber 80 is provided on an exemplary engine 10, but preferably two are provided for each valve body 62. Piston chamber 80 consists of a piston cylinder 82, an inflow port 84, an isolation chamber 86, an axial spline engagement 88, an outflow port 90, a gas release chamber 92, and an ignition tube extension 94. Referring to FIG. 4, a reciprocating piston 96 is positioned within piston cylinder 82. Piston cylinder 82 extends along an axis 98 which is a portion of a chord 100 extending substantially parallel to and spaced from a diameter of stationary plate assembly 16. Piston 96 consists of a plunger end 102, a crank shaft end 104, and a rod 106. Referring to FIG. 14A, plunger end 102 is curved relative to an imaginary line perpendicular to axis 98 of rod 106. Referring to FIG. 4, this is done in order to get maximum penetration of piston chamber 80 when forcing the fuel and air mixture into ignition tube extension 94 without impinging on a circumference of valve body 62. Alternatively, plunger end 102 may be angled relative to axis 98. Referring to FIG. 13, rod 106 may have a spline channel 108 on an inner surface 11. Referring to FIG. 4, axial spline engagement 88 is between stationary plate assembly 16 and inner surface 11 of piston 96. Axial spline engagement 88 is provided as a spline rail 112 that is engaged within spline channel 108 (shown in FIG. 7) at crank shaft end 104 of piston 96. Alternatively, spline channel 108 may be positioned on an outer surface of rod 106. Spline rail 112 attaches to a point along axis 98 opposited plunger end 102, spline rail 112 ensuring that piston 96 is always positioned along axis 98. Additionally, piston 96 may have circumferential sealing rings 114 for ensuring that there is little to no gas leakage past plunger end 102. Each of piston 96 is coupled to crank shaft 18 such that rotation of crank shaft 18 results in reciprocal movement of piston 96 in piston cylinder 82. Referring to FIG. 14A, a rigid linkage 138 pivotally connects crank shaft end 104 of piston 96 to crank shaft 18. Rigid linkage 138 has a piston cam clamp 140, a piston cam 141, a first lever arm 142 and a second lever arm 152. Piston cam 141 connects crank shaft 18 to piston cam clamp 140. Piston cam clamp 140 fits over an outer profile 139 of piston cam 141. Piston cam 141 may include bearings (not shown) to allow piston cam clamp 140 to slide over outer profile 139 and move in a reciprocal motion while piston cam 141 rotates. First lever arm 142 is pivotally anchored to valve body 62 (shown in FIG. 6) on one end with the other end being pivotally connected to a first end 158 of piston cam clamp 140. First lever arm 142 is configured to restrict the rotational movement of piston cam clamp 140 such that rotation of piston cam 141 is translated into reciprocal motion of piston cam clamp 140. Second lever arm 152 pivotally connects a second end 160 of piston cam clamp 140 to crank shaft end 104 of piston 96, such that the reciprocal motion of piston cam clamp 140 is translated into back and forth motion of piston 96. Referring to FIG. 14B, second lever arm 152 is better illustrated. Referring to FIG. 14A, this setup allows the rotation of crank shaft 18 to pull piston 96 into compression (shown in FIG. 14A) and push piston 96 into exhaust (shown in FIG. 14D). A lever arm 142 is pivotally secured on one end to valve body 62 (shown in FIG. 6), and on the other end to piston cam clamp 140. First lever arm 142 ensures that piston cam clamp 140 can only move in such a way that affords reciprocating back and forth movement of piston 96 within piston cylinder 82.

Figure 5:
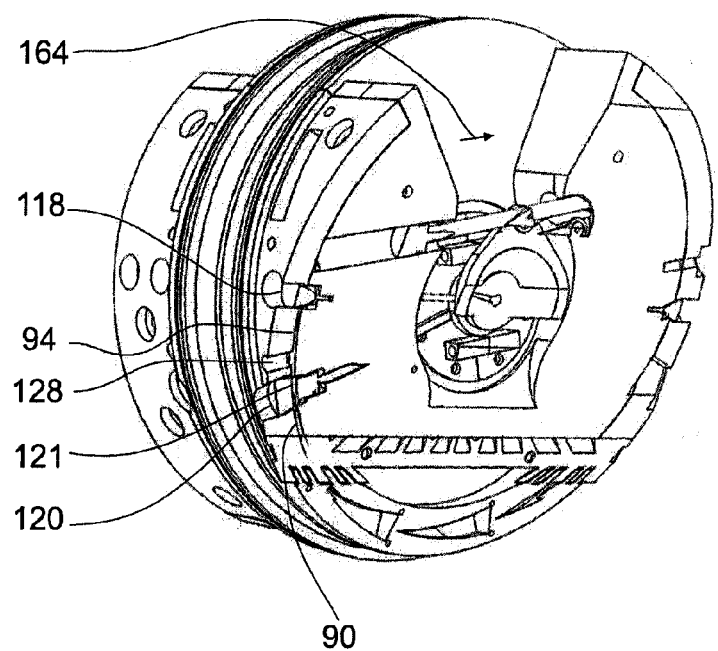
FIG. 5 is a cut-away perspective view illustrating the engine from FIG. 2 with the piston in the inflow stage.
Figure 7:
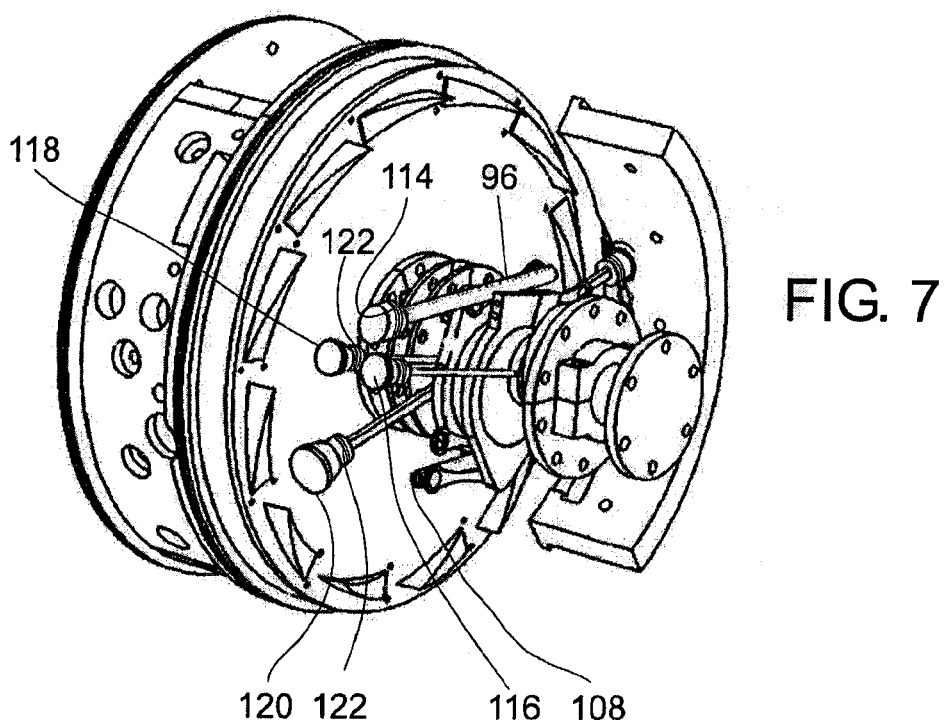
FIG. 7 is a cut-away perspective view illustrating the vane fill disc from the engine of FIG. 1.
Figure 10:
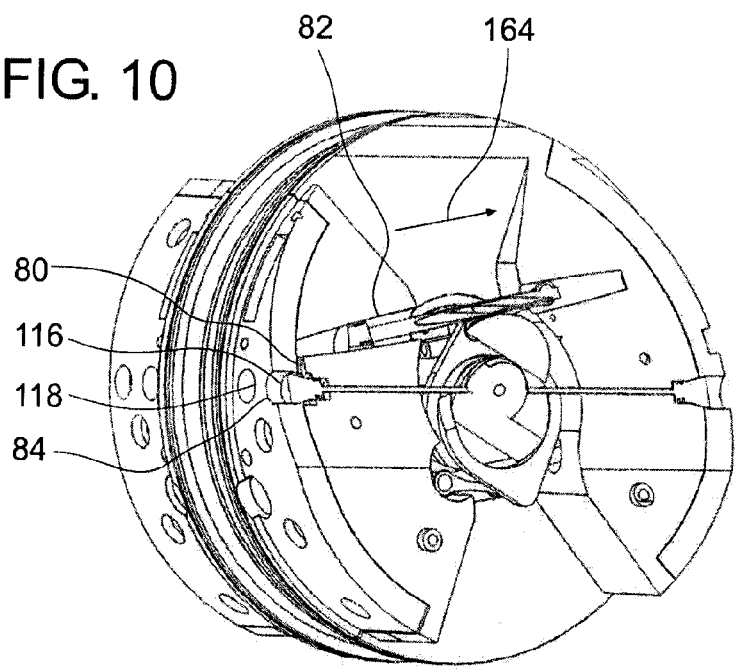
FIG. 10 is a cut-away perspective view illustrating the engine of FIG. 1 with an inflow valve in the inflow stage.
Figure 15:
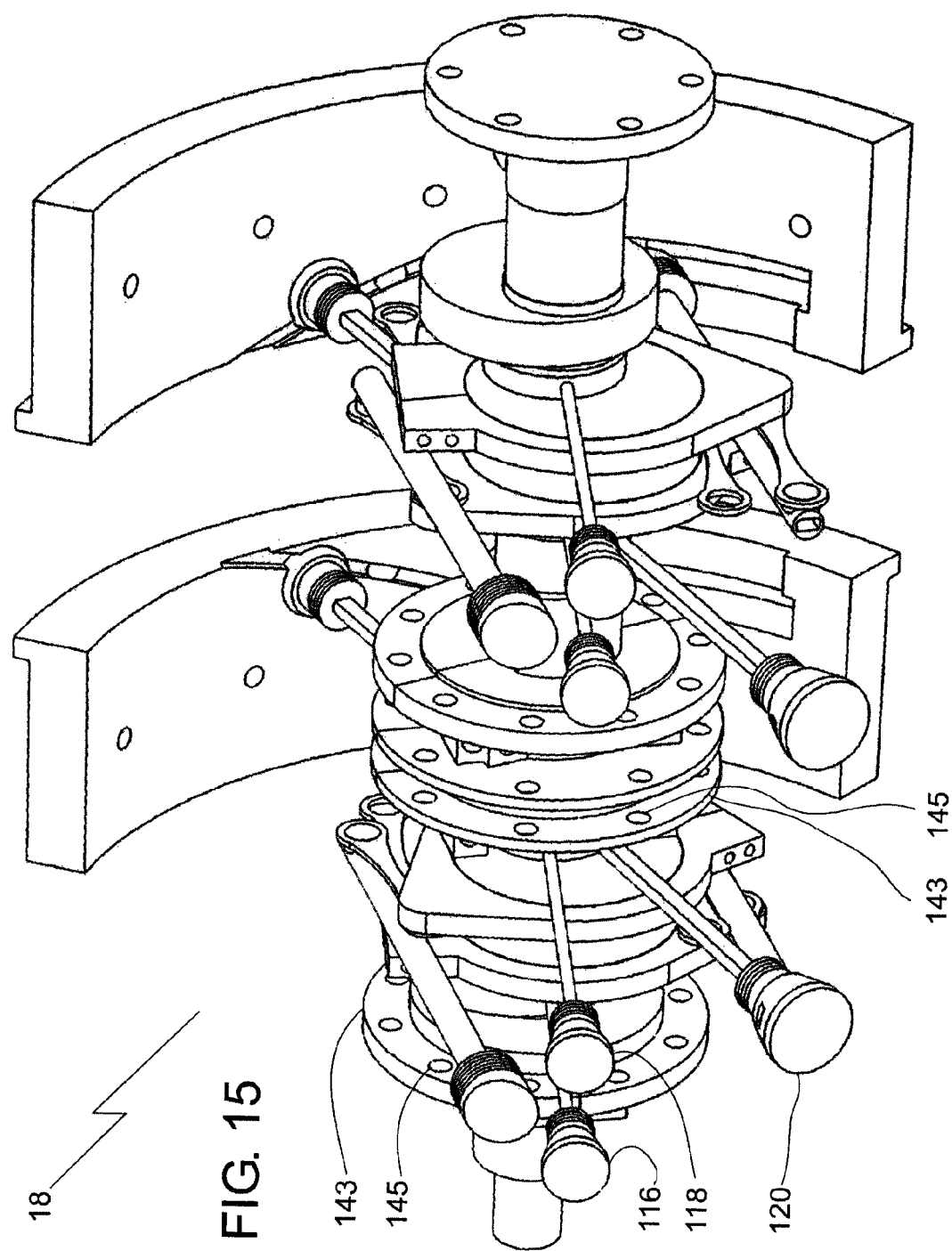
FIG. 15 is a cut-away perspective view illustrating the crank shaft from the engine of FIG. 1.

Referring to FIG. 10, inflow port 84 has an inflow valve 116 positioned within it. A throttle (not shown) may be in fluid connection to inflow port 84. Inflow valve 116 may be used to supply air, or a combustible air-fuel mixture into piston chamber 80. If inflow valve 116 only supplies air, then an additional valve (not shown) must be employed to supply fuel, and a mechanism used to mix the air and fuel together prior to igniting. Referring to FIG. 6, isolation chamber 86 contains an isolation valve 118 that is configured to seal ignition tube extension 94 from piston cylinder 82. Isolation valve 118 is positioned in ignition tube extension 94 to isolate ignition tube extension 94 from a balance of piston chamber 80 during ignition of the fuel and air mixture in ignition tube extension 94. Gas release chamber 92 contains a gas release valve 120 that is configured to seal ignition tube extension 94 from outflow port 90. Referring to FIGS. 5 and 6, gas release valve 120 has an interior gas channel 121 that allows compressed gas to flow from injection tube extension 94 into outflow port 90. Gas channel 121 moves into register with ignition tube extension 94 and outflow port 90 when gas release valve 120 is in an open position, and moves out of register with ignition tube extension 94 and outflow port 90 when gas release valve 120 is in a closed position. Referring to FIG. 6, valves 116, 118, and 120 are provided for selectively opening and closing inflow port 84 and outflow port 90 to facilitate a fuel and air injection, compression, ignition and exhaust combustion cycle. Referring to FIG. 7, each of valves 116, 118, and 120 have circumferential sealing rings 122. Sealing rings 122 function in the same manner as sealing rings 114 of piston 96. Referring to FIG. 15, each of valves 116, 118, and 120 are coupled to crank shaft 18 such that rotation of crank shaft 18 opens and closes each of valves 116, 118, and 120 during the combustion cycle. This is accomplished by using various cams and cam assemblies, timed so that they perform their appropriate function at the right time.

Figure 17:
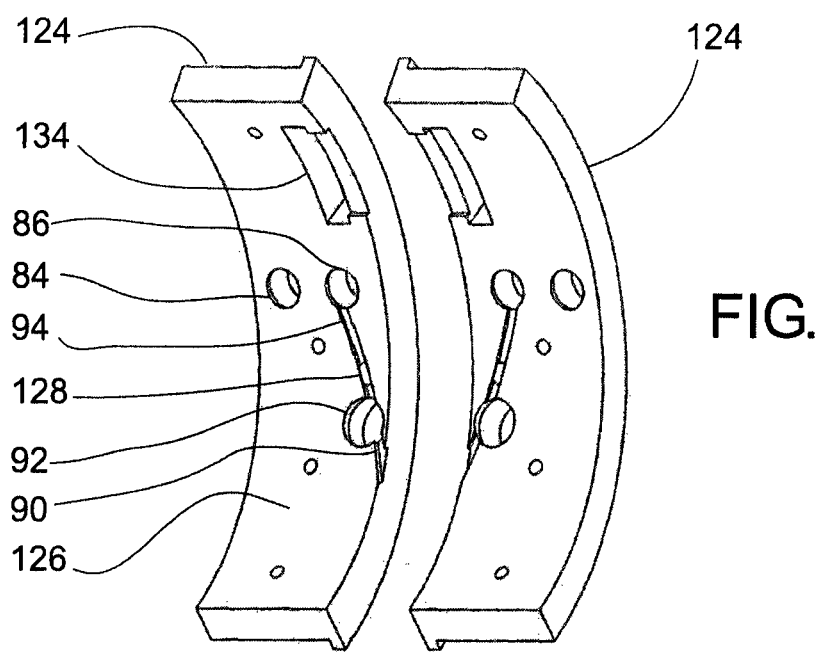
FIG. 17 is a perspective view of two valve heads from the engine of FIG. 1.

Referring to FIG. 6, a valve head 124 is connected to either side of valve body 62. Referring to FIG. 17, inflow port 84, isolation chamber 86, outflow port 90, gas release chamber 92, and ignition tube extension 94 are all defined on an inner surface 126 of valve head 124, in addition to being defined upon an outer edge 130 (shown in FIG. 6) of valve body 62. Ignition tube extension 94 has a slot for an igniter 128. Piston 96 (shown in FIG. 6) compresses the fuel and air mixture, with igniter 128 communicates with ignition tube extension 94 to ignite the combustible fuel and air mixture. Referring to FIG. 17, each ignition tube extension 94 is positioned on a circumference of inner surface 126 of valve head 124. Valve head 124 also has exhaust ports 134. Referring to FIG. 6, exhaust ports 134 are in fluid communication with the one of vanes 48 that is in alignment with gas outflow passage 74 of containment plate 60. Outflow port 90 is shown in fluid communication with the one of vanes 48 that is aligned with gas inflow passage 76 of containment plate 60. As shown in the illustration of FIG. 6, outflow port 90, gas inflow passage 76, and propulsion surface 50 are all angled such that the direction of compressed gas entering vane 48 through outflow port 90 is as close or equal to perpendicular to propulsion surface 50 as is possible. This perpendicularity ensures that optimal force transfer is achieved, and that a force is imparted to rotate rotating plate assembly 14. Referring to FIG. 3, bolt holes 135 connect to bolt holes 70 of containment plate 60, securing containment plate 60 and valve body 62 together. Valve body 62 also has bolts 136 for attaching to end plate 64. Additionally, valve head 124 is bolted to valve body 62.

Figure 18:
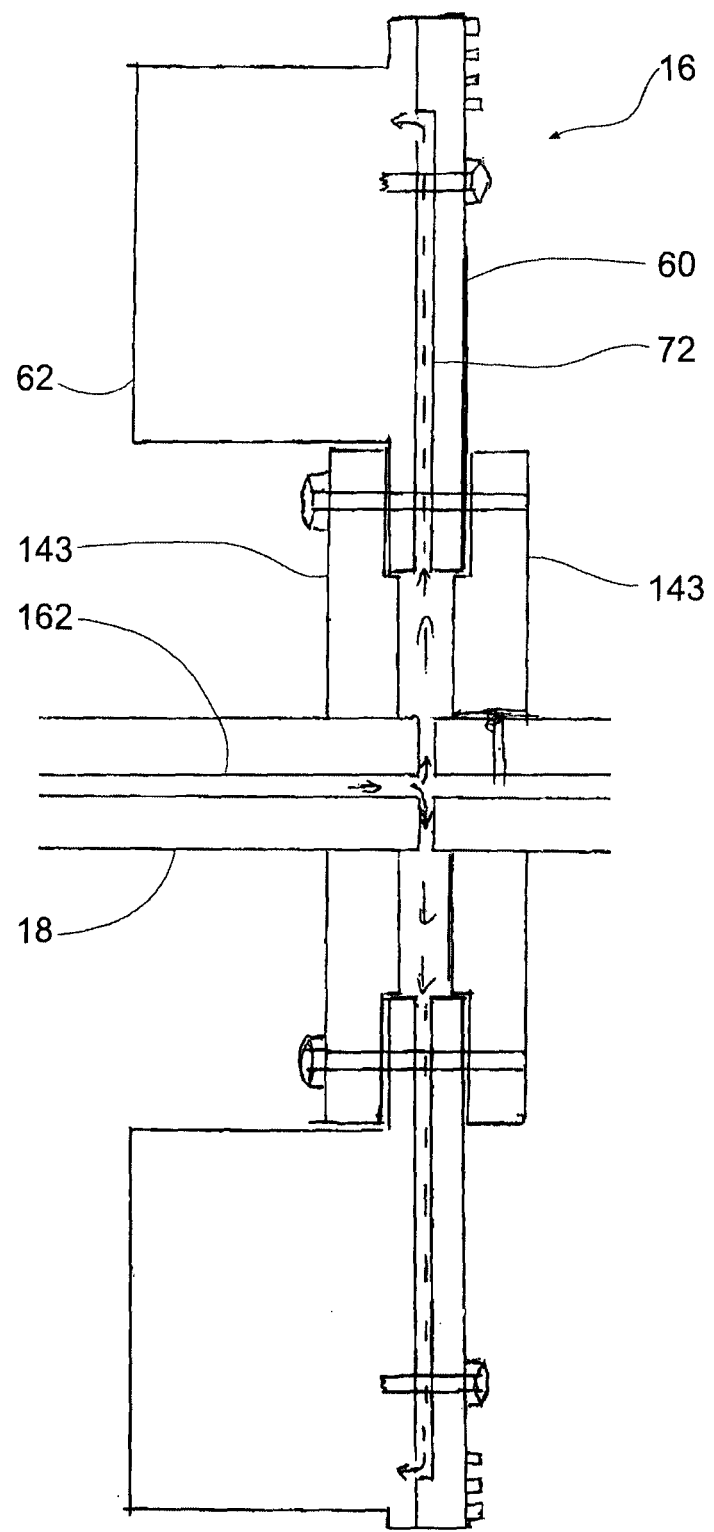
FIG. 18 is a side elevation view, in section, of the oil coolant system of the engine of FIG. 1.

Referring to FIG. 3, crank shaft 18 is mounted for rotation in housing 12. Additionally, crank shaft 18 is coupled for rotation with rotating plate assembly 14, such that rotation of crank shaft 18 rotates rotating plate assembly 14, and rotation of rotating plate assembly 14 rotates crank shaft 18. Additionally, a clutch (not shown) may be employed to selectively engage or disengage crank shaft 18 from rotating plate assembly 14. Crank shaft 18 may be connected to a drive shaft (not shown), in order to allow the rotational energy of crank shaft 18 to be used to do work. An example of a suitable application would involve using engine 10 to power a car (not shown). Each of rotating plate assembly 14 and stationary plate assembly 16 have central holes through which crank shaft 18 passes in order to connect with each of plate assemblies 14 and 16. Additionally, each of vane fill disc 40, containment plate 60, valve body 62, and end plate 64 may have an inner ring of bolt holes 150 that can be used to secure each component to crank shaft 18. Referring to FIG. 15, bearings 143 may be used between crank shaft 18 and stationary plate assembly 16, as well as in various other applications throughout engine 10. FIG. 15 illustrates crank shaft 18 with half of bearings 143 removed. Bearings 143 may be bolted to stationary plate assembly 16 by placing bolts (not shown) through bolt holes 145 and 150 (shown in FIG. 3). Referring to FIG. 18, crank shaft 18 has coolant system 162 that travels through it, which is used to cool the various parts of engine 10. Coolant from coolant system 162 may flow in between bearings 143, and into coolant tubing profile 72 of containment plate 60. From there, coolant may be supplied to valve body 62. Coolant may be supplied in a similar fashion to the other components of stationary plate assembly 16. Additionally, coolant may be supplied to rotating plate assembly 14 (shown in FIG. 6) in a similar fashion if a clutch (not shown) is employed. It should be understood that many different designs for coolant system 162 may be employed.

Referring to FIG. 3, end plate 64 has bolt holes 144. Bolt holes 144 allow end plate 64 to be bolted to valve body 62 through bolt holes 136. An outer ring of bolt holes 146 allows end plate 64 to be secured to bolt holes 148 of housing 12. End plates 64 function by closing off the sides of engine 10, thereby protecting the interior moving components from the outside.

Referring to FIG. 3, a pressure release valve (not shown) may be positioned at any point on exhaust tubes 32, gas outflow passages 74, and exhaust ports 134. Alternatively, the pressure release valve may be positioned at any point along the path of exhaust from engine 10. The pressure release valve may be used to maintain a minimum pressure in vanes 48, in order to improve the performance of engine 10. A minimum pressure in vanes 48 may aid in the exertion of a rotational force on rotating plate assembly 14 from compressed combusted gases by providing a fluidic medium in which compressed combusted gases can apply force to. Alternatively, the pressure release valve may be used to vary the pressure in vanes 48.

It should be understood that the sizes and dimensions of the elements of plate assemblies 14 and 16 can all be adjusted to optimize performance. Only one example has been shown and is not intended to be in any way limiting.

Figure 11:
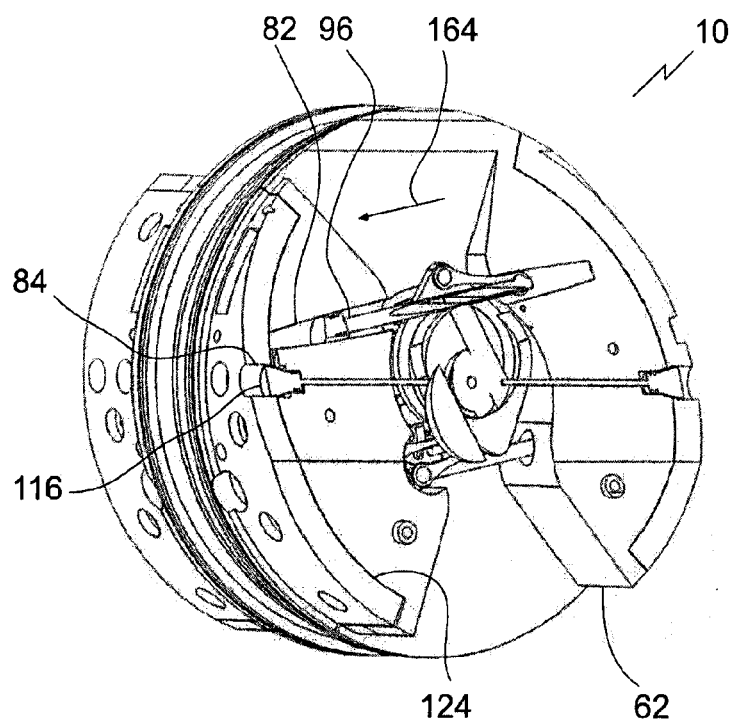
FIG. 11 is a cut-away perspective view illustrating the engine from FIG. 10 with the inflow valve in the compression stage.

Operation:

Referring to FIG. 14A, piston 96 is just beginning the compression cycle of its stroke. Referring to FIG. 6, inflow valve 116 has just closed, after drawing in a fuel and air mixture through inflow port 84 into piston cylinder 82. Once inflow valve 116 is closed, usually just at the point where piston 96 begins the compression cycle, isolation valve 118 begins to open, allowing the fuel and air mixture drawn into piston cylinder 82 to be pushed into injection tube extension 94. Gas release valve 120 has been closed since isolation valve 118 began to open. Gas release valve 120 is effectively closed by orienting gas channel 121 (shown by dotted lines) below injection tube extension 94. Referring to FIG. 14A, it is clear that rigid linkage 138 has begun to pull piston 96 into its compressive stroke, as crank shaft 18 is rotating counter-clockwise. Referring to FIG. 14B, the pulling motion is more distinctly illustrated as piston cam clamp 140 is currently progressing through a quick and powerful compressive stroke. Referring to FIG. 11, inflow valve 116 is closed, preventing any fuel and air mixture from entering piston cylinder 82 through inflow port 84. Referring to FIG. 4, isolation valve 118 is wide open, allowing the fuel and air mixture to be compressed into injection tube extension 94. In addition, gas channel 121 is still positioned below injection tube extension 96, effectively closing gas release valve 120, and preventing the fuel and air mixture from entering outflow port 90 at this point.

Figure 2:
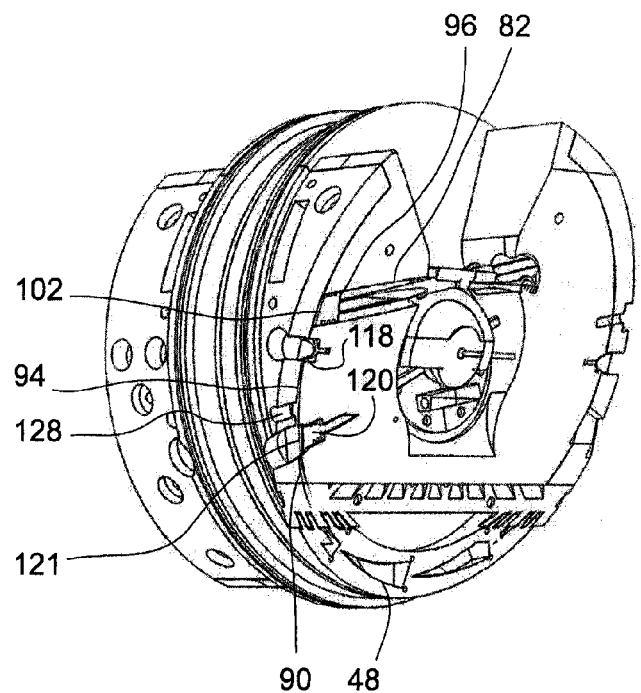
FIG. 2 is a cut-away perspective view illustrating the engine from FIG. 1 with a piston at full compression.
Figure 14C:
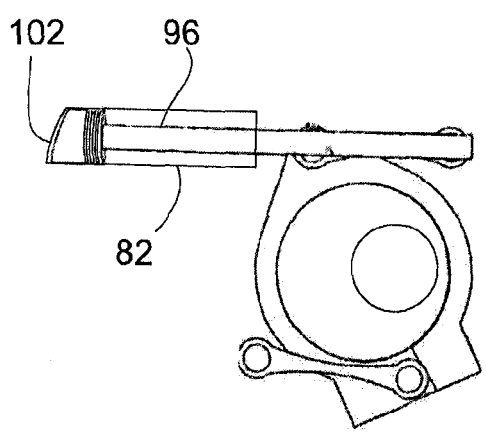
Figure 14D:
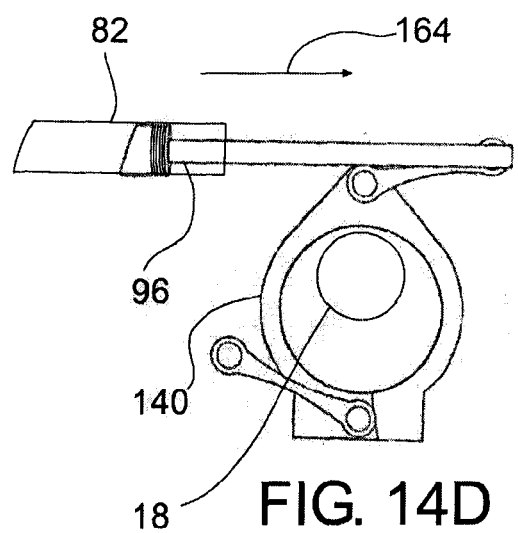

Referring to FIG. 14C, piston 96 has now reached the end of the compression stage, and is oriented at the furthest compressive point in its stroke. It is evident at this point that the curvature of plunger end 102 matches the curvature at the end of piston cylinder 82. Referring to FIG. 2, this helps to ensure that the maximum amount of fuel and air mixture are compressed into injection tube extension 94, by reducing the effective volume of the compressive space between plunger end 102 and the end of piston cylinder 82 to almost zero. At the same moment as piston 96 reaches the end of its stroke, isolation valve 118 closes, such that the maximum gas pressure created by piston 96 is stabilized within injection tube extension 94 prior to piston 96 beginning the inflow stage of its stroke. At this point, gas channel 121 is just about to move into fluid communication with injection tube extension 94 and outflow port 90, and gas release valve 120 is still effectively closed. Igniter 128, typically provided as a spark plug (not shown) is now active, and the fuel and air mixture is combusted and expands, greatly increasing the gas pressure contained within injection tube extension 94. Referring to FIG. 14D, piston 96 is now in the inflow stage, drawing in a new fuel and air mixture into piston cylinder 82 from inflow port 84 (shown in FIG. 10). Piston cam clamp 140 is now pushing piston 96 out of piston cylinder 82, with cam shaft 18 continuing to rotate in a counter-clockwise direction. Referring to FIG. 10, inflow valve 116 is open, allowing the new fuel and air mixture to enter piston cylinder 82. Inflow valve 116 typically begins to open as soon as isolation valve 118 closes at the end of the compressive stage. Referring to FIG. 5, isolation valve 118 remains closed during the inflow stage. Gas channel 121 is now in fluid communication with ignition tube extension 94 and outflow port 90, effectively opening gas release valve 120, and allowing the highly compressed combusted gases to flow from ignition tube extension 94 into outflow port 90. Gas release valve 120 typically effectively opens as soon as igniter 128 ignites the fuel and air mixture, which occurs after the closure of isolation valve 118. Referring to FIG. 6, the opening of gas release valve 120 should be timed to coincide with propulsion surface 50 of one of vanes 48 coming into fluid communication with outflow port 90 and gas inflow passage 76. As rotating plate assembly 14 rotates, a number of vanes 48 rotate past gas inflow passage 76, and the compressed combusted gases contained within injection tube extension 94 are largely transferred into the volumes of vanes 48. The cycle described above then repeats itself. In other embodiments of engine 10, more pistons 96 may be supplied such that all of vanes 48 are used.

Referring to FIG. 6, the flow of compressed combusted gases against propulsion surface 50 imparts a rotational force upon rotating plate assembly 14. As a vane 48 continues to rotate, compressed combusted gases continue to flow into vane 48, continuing to exert the rotational force on vane 48, until vane 48 moves out of fluid communication with gas inflow passage 76. Vane 48 is now filled with compressed combusted gas. Because vane 48 must be relatively de-pressurized in order to be again filled with compressed combusted gas, exhaust ports 134 are provided on valve head 124. As vane 48 rotates into fluid communication with gas outflow passage 74 of containment plate 60, the compressed combusted gases contained within are exhausted through exhaust port 134. Exhaust port 134 may be connected to a conduit system (not shown) designed to provide an escape route for exhausted gases to leave engine 10.

Referring to FIG. 11, two pistons 96 are provided for each valve body 62. Each piston 96 has a cycle that is off-set by one-hundred eighty degrees from the other piston 96. This off-set ensures smooth operation of engine 10. Because of the presence of two pistons 96 on a valve body 62, each vane 48 (shown in FIG. 8) must be exhausted prior to being filled with compressed combusted gases. Therefore, two valve heads 124 are provided for each valve body 62. Referring to FIG. 3, cam shaft 18 and stationary plate assemblies 16 are constructed such that both valve bodies 62 are aligned with and opposing one another, so that the combustion cycles of both pistons 96 on one valve body 62 are reflected and aligned at the same time along the plane defined by valve fill disc 40 by both pistons 96 on the other valve body 62. Referring to FIG. 6, this synchronization includes orienting gas inflow passages 76 to deliver combusted gases to rotating plate assembly 14 at the same axial location. This synchronization is important, as each compressed combusted gas delivery imparts a lateral force component onto rotating plate assembly 14, and this lateral force component must be cancelled out. If the lateral force component is not accounted for, engine 10 may experience vibrational damage.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A rotary internal combustion engine, comprising:
   a housing;
   a rotating plate assembly comprising at least one circular plate mounted for rotation within the housing, the rotating plate assembly having at least one inflow passage for receiving combustion gases, at least one outflow passage for venting combustion gases, and a plurality of vanes disposed between the at least one inflow passage and the at least one outflow passage, such that combustion gases encounter the vanes and impart a rotational force to the rotating plate assembly as the combustion gases pass from the at least one inflow passage to the at least one outflow passage;
   at least one stationary plate assembly comprising at least one circular plate fixed within the housing immediately adjacent to the rotating plate assembly, the stationary plate assembly defining at least one piston chamber in which is disposed a reciprocating piston, each piston chamber extending along an axis which is a portion of a chord extending substantially parallel to and spaced from a diameter of the stationary plate assembly, each piston chamber having at least one inflow port for a combustible fuel and air mixture, at least one igniter for igniting the combustible fuel and air mixture, at least one outflow port, and valves for selectively opening and closing of the inflow port and the outflow port to facilitate a fuel and air injection, compression, ignition and exhaust combustion cycle, each outflow port being in fluid communication with the at least one inflow passage of the rotating plate assembly, such that combustion gases exiting each outflow port flow into the rotating plate assembly, each piston chamber having an ignition tube extension into which the piston compresses the fuel and air mixture, the igniter igniting fuel in the ignition tube extension, an isolation valve being positioned in the ignition tube extension, to isolate the ignition tube extension from a balance of the piston chamber during ignition of the fuel and air mixture in the ignition tube extension, such that the fuel and air mixture in the ignition tube extension is ignited without causing ignition in the piston chamber;
   a crank shaft mounted for rotation in the housing, the crank shaft being coupled for rotation with the rotating plate assembly, such that rotation of the crank shaft rotates the rotating plate assembly and rotation of the rotating plate assembly rotates the crank shaft, the valves being coupled to the crank shaft such that rotation of the crank shaft opens and closes the valves during the combustion cycle, each piston being coupled to the crank shaft such that rotation of the crank shaft results in reciprocal movement of the pistons in the piston chambers.

2. The engine of claim 1, wherein there are two stationary plate assemblies with the rotating plate assembly positioned in between.

3. The engine of claim 1, wherein each ignition tube extension is positioned on a circumference of one of an inner surface of the body or an outer edge of the stationary plate assembly.

4. The engine of claim 3, wherein a remote end of a plunger of each piston is curved or at an angle to an axis of the plunger to get maximum penetration of the piston chamber without impinging on a circumference of the stationary plate assembly.

5. The engine of claim 1, wherein there is an axial spline engagement between the stationary plate assembly and the piston.

6. The engine of claim 5, wherein the axial spline engagement is a spline rail engaged in a spline channel at a remote end of the piston.

7. The engine of claim 1, wherein multi-row concentric circular labyrinth seals are positioned between the rotating plate assembly and each of the at least one stationary plate assembly.

8. The engine of claim 1, wherein each of the piston and the valves have circumferential sealing rings.

9. The engine of claim 1, wherein each piston has a plunger end and a crank shaft end, a rigid linkage pivotally connects the crank end of the piston with the crank shaft, the rotation of the crank shaft pulling the piston into compression and pushing the piston into exhaust.

10. The engine of claim 9, wherein the rigid linkage comprises:
   a piston cam, the piston cam having an outer profile, the piston cam being rotatably connected to the crank shaft;
   a cam clamp slidably fitting over the outer profile of the piston cam;
   a first lever arm pivotally anchored to the engine on a first end with a second end being pivotally connected to a first end of the cam clamp, such that the first lever arm is configured to restrict the rotational movement of the cam clamp such that rotation of the cam is translated into reciprocal motion of the cam clamp; and
   a second lever arm pivotally connecting a second end of the cam clamp to the crank shaft end of the piston, such that the reciprocal motion of the cam clamp is translated into back and forth motion of the piston.

11. The engine of claim 1, wherein the piston chamber further comprises a gas release valve, the gas release valve comprising a gas channel that moves into register with the inflow passage when the gas release valve is in an open position, and moves out of register with the inflow passage when the gas release valve is in a closed position.

12. The engine of claim 1 wherein opposing stationary plate assemblies are aligned and configured to be synchronized such that combustion gases are delivered to opposing sides of the rotating plate assembly at the same time and in the same axial location to cancel out lateral forces.

13. The engine of claim 1 wherein a clutch connects the rotating plate assembly and the crank shaft.

14. A rotary internal combustion engine, comprising:
a housing;
a rotating plate assembly made up of at least one circular disk and mounted for rotation within the housing, the rotating plate assembly having at least one inflow passage for receiving combustion gases, at least one outflow passage for venting combustion gases, and a plurality of vanes disposed between the at least one inflow passage and the at least one outflow passage, such that combustion gases encounter the vanes and impart a rotational force to the rotating plate assembly as the combustion gases pass from the at least one inflow passage to the at least one outflow passage;
two stationary plate assemblies made up of more than one circular disks, one stationary plate assembly fixed within the housing on either side of and immediately adjacent to the rotating plate assembly, each stationary plate assembly defining at least one piston chamber in which is disposed a reciprocating piston, each piston chamber extends along an axis which is a portion of a chord extending substantially parallel to and spaced from a diameter of the stationary plate assembly, an axial spline engagement being provided between the stationary plate assembly and the piston, each piston chamber having at least one inflow port for a combustible fuel and air mixture, at least one igniter for igniting the combustible fuel and air mixture, at least one outflow port, and valves for selectively opening and closing of the inflow port and the outflow port to facilitate a fuel and air injection, compression, ignition and exhaust combustion cycle, each piston chamber has an ignition tube extension into which the piston compresses the fuel and air mixture, the igniter communicating with the ignition tube extension, an isolation valve being positioned in the ignition tube extension to isolate the ignition tube extension from a balance of the piston chamber during ignition of the fuel and air mixture in the ignition tube extension, each ignition tube extension is positioned on a circumference of one of an inner surface of the body or an outer edge of the stationary plate assembly, a remote end of a plunger of each piston is curved or at an angle to an axis of the plunger to get maximum penetration of the piston chamber when forcing the fuel and air mixture into the ignition tube extension without impinging on a circumference of the stationary plate assembly, each outflow port leading from the ignition tube extension being in fluid communication with the at least one inflow passage of the rotating plate assembly, such that combustion gases exiting each outflow port flow into the rotating plate assembly strike the vanes and impart a force to rotate the rotating plate assembly;
a crank shaft mounted for rotation in the housing, the crank shaft being coupled for rotation with the rotating plate assembly, such that rotation of the crank shaft rotates the rotating plate assembly and rotation of the rotating plate assembly rotates the crank shaft, the valves being coupled to the crank shaft such that rotation of the crank shaft opens and closes the valves during the combustion cycle, each piston being coupled to the crank shaft such that rotation of the crank shaft results in reciprocal movement of the pistons in the piston chambers.

15. The engine of claim 14, wherein the axial spline engagement is a spline rail engaged in a spline channel at a remote end of the piston.

16. The engine of claim 14, wherein multi-row concentric circular labyrinth seals are positioned between the rotating plate assembly and each of the at least one stationary plate assembly.

17. The engine of claim 14, wherein each the valves have circumferential sealing rings.

18. The engine of claim 14, wherein each piston has a plunger end and a crank shaft end, a rigid linkage pivotally connects the crank end of the piston with the crank shaft, the rotation of the crank shaft pulling the piston into compression and pushing the piston into exhaust.

19. The engine of claim 18, wherein the rigid linkage comprises:
a piston cam, the piston cam having an outer profile, the piston cam being rotatably connected to the crank shaft;
a cam clamp slidably fitting over the outer profile of the piston cam;
a first lever arm pivotally anchored to the engine on a first end with a second end being pivotally connected to a first end of the cam clamp, such that the first lever arm is configured to restrict the rotational movement of the cam clamp such that rotation of the cam is translated into reciprocal motion of the cam clamp; and
a second lever arm pivotally connecting a second end of the cam clamp to the crank shaft end of the piston, such that the reciprocal motion of the cam clamp is translated into back and forth motion of the piston.

20. The engine of claim 14, wherein the piston chamber further comprises a gas release valve, the gas release valve comprising a gas channel that moves into register with the ignition tube extension and the outflow port when the gas release valve is in an open position and moves out of register with the ignition tube extension and outflow port when the gas release valve is in a closed position.

21. The engine of claim 14 wherein opposing stationary plate assemblies are aligned and configured to be synchronized such that combustion gases are delivered to opposing sides of the rotating plate assembly at the same time and in the same axial location to cancel out lateral forces.

22. The engine of claim 14 wherein a clutch connects the rotating plate assembly and the crank shaft.

23. A rotary internal combustion engine, comprising:
a housing;
a rotating plate assembly comprising at least one circular plate mounted for rotation within the housing, the rotating plate assembly having at least one inflow passage for receiving combustion gases, at least one outflow passage for venting combustion gases, and a plurality of vanes disposed between the at least one inflow passage and the at least one outflow passage, such that combustion gases encounter the vanes and impart a rotational force to the rotating plate assembly as the combustion gases pass from the at least one inflow passage to the at least one outflow passage;
opposing stationary plate assemblies are aligned and configured to be synchronized such that combustion gases are delivered to opposing sides of the rotating plate assembly at the same time and in the same axial location to cancel out lateral forces, the stationary plate assemblies each comprising at least one circular plate fixed within the housing immediately adjacent to the rotating plate assembly, the stationary plate assemblies defining at least one piston chamber in which is disposed a reciprocating piston, each piston chamber extending along an axis which is a portion of a chord extending substantially parallel to and spaced from a diameter of the stationary plate assemblies, each piston chamber having at least one inflow port for a combustible fuel and air mixture, at least one igniter for igniting the combustible fuel and air mixture, at least one outflow port, and valves for selectively opening and closing of the inflow port and the outflow port to facilitate a fuel and air injection, compression, ignition and exhaust combustion cycle, each outflow port being in fluid communication with the at least one inflow passage of the rotating plate assembly, such that combustion gases exiting each outflow port flow into the rotating plate assembly;

a crank shaft mounted for rotation in the housing, the crank shaft being coupled for rotation with the rotating plate assembly, such that rotation of the crank shaft rotates the rotating plate assembly and rotation of the rotating plate assembly rotates the crank shaft, the valves being coupled to the crank shaft such that rotation of the crank shaft opens and closes the valves during the combustion cycle, each piston being coupled to the crank shaft such that rotation of the crank shaft results in reciprocal movement of the pistons in the piston chambers; and multi-row concentric circular labyrinth seals positioned between the rotating plate assembly and each of the at least one stationary plate assembly.

24. The engine of claim 23, wherein there are two stationary plate assemblies with the rotating plate assembly positioned in between.

25. The engine of claim 23, wherein each piston chamber has an ignition tube extension into which the piston compresses the fuel and air mixture, the igniter igniting fuel in the ignition tube extension, an isolation valve being positioned in the ignition tube extension, to isolate the ignition tube extension from a balance of the piston chamber during ignition of the fuel and air mixture in the ignition tube extension, such that the fuel and air mixture in the ignition tube extension is ignited without causing ignition in the piston chamber.

26. The engine of claim 25, wherein each ignition tube extension is positioned on a circumference of one of an inner surface of the body or an outer edge of the stationary plate assembly.

27. The engine of claim 26, wherein a remote end of a plunger of each piston is curved or at an angle to an axis of the plunger to get maximum penetration of the piston chamber without impinging on a circumference of the stationary plate assembly.

28. The engine of claim 23, wherein there is an axial spline engagement between the stationary plate assembly and the piston.

29. The engine of claim 28, wherein the axial spline engagement is a spline rail engaged in a spline channel at a remote end of the piston.

30. The engine of claim 23, wherein each of the piston and the valves have circumferential sealing rings.

31. The engine of claim 23, wherein each piston has a plunger end and a crank shaft end, a rigid linkage pivotally connects the crank end of the piston with the crank shaft, the rotation of the crank shaft pulling the piston into compression and pushing the piston into exhaust.

32. The engine of claim 31, wherein the rigid linkage comprises:
a piston cam, the piston cam having an outer profile, the piston cam being rotatably connected to the crank shaft;
a cam clamp slid ably fitting over the outer profile of the piston cam;
a first lever arm pivotally anchored to the engine on a first end with a second end being pivotally connected to a first end of the cam clamp, such that the first lever arm is configured to restrict the rotational movement of the cam clamp such that rotation of the cam is translated into reciprocal motion of the cam clamp; and
a second lever arm pivotally connecting a second end of the cam clamp to the crank shaft end of the piston, such that the reciprocal motion of the cam clamp is translated into back and forth motion of the piston.

33. The engine of claim 23, wherein the piston chamber further comprises a gas release valve, the gas release valve comprising a gas channel that moves into register with the inflow passage when the gas release valve is in an open position, and moves out of register with the inflow passage when the gas release valve is in a closed position.

34. The engine of claim 23 wherein a clutch connects the rotating plate assembly and the crank shaft.

35. A rotary internal combustion engine, comprising:
a housing;
a rotating plate assembly comprising at least one circular plate mounted for rotation within the housing, the rotating plate assembly having at least one inflow passage for receiving combustion gases, at least one outflow passage for venting combustion gases, and a plurality of vanes disposed between the at least one inflow passage and the at least one outflow passage, such that combustion gases encounter the vanes and impart a rotational force to the rotating plate assembly as the combustion gases pass from the at least one inflow passage to the at least one outflow passage;
opposing stationary plate assemblies are aligned and configured to be synchronized such that combustion gases are delivered to opposing sides of the rotating plate assembly at the same time and in the same axial location to cancel out lateral forces, the stationary plate assemblies each comprising at least one circular plate fixed within the housing immediately adjacent to the rotating plate assembly, the stationary plate assemblies defining at least one piston chamber in which is disposed a reciprocating piston, each piston chamber extending along an axis which is a portion of a chord extending substantially parallel to and spaced from a diameter of the stationary plate assemblies, each piston chamber having at least one inflow port for a combustible fuel and air mixture, at least one igniter for igniting the combustible fuel and air mixture, at least one outflow port, and valves for selectively opening and closing of the inflow port and the outflow port to facilitate a fuel and air injection, compression, ignition and exhaust combustion cycle, each outflow port being in fluid communication with the at least one inflow passage of the rotating plate assembly, such that combustion gases exiting each outflow port flow into the rotating plate assembly; and
a crank shaft mounted for rotation in the housing, the crank shaft being coupled for rotation with the rotating plate assembly, such that rotation of the crank shaft rotates the rotating plate assembly and rotation of the rotating plate assembly rotates the crank shaft, the valves being coupled to the crank shaft such that rotation of the crank shaft opens and closes the valves during the combustion cycle, each piston being coupled to the crank shaft such that rotation of the crank shaft results in reciprocal movement of the pistons in the piston chamber and each piston having a plunger end and a crank shaft end, a rigid linkage pivotally connecting the crank end of the piston with the crank shaft, the rotation of the crank shaft pulling the piston into compression and pushing the piston into exhaust, the rigid linkage comprising:

a piston cam, the piston cam having an outer profile, the piston cam being rotatably connected to the crank shaft;

a cam clamp slid ably fitting over the outer profile of the piston cam;

a first lever arm pivotally anchored to the engine on a first end with a second end being pivotally connected to a first end of the cam clamp, such that the first lever arm is configured to restrict the rotational movement of the cam clamp such that rotation of the cam is translated into reciprocal motion of the cam clamp; and a second lever arm pivotally connecting a second end of the cam clamp to the crank shaft end of the piston, such that the reciprocal motion of the cam clamp is translated into back and forth motion of the piston.

* * * * *